United States Patent Office 3,193,528
Patented July 6, 1965

3,193,528
PROCESS OF PREPARING MONOCHLOROFORMATES AND PROCESS OF PREPARING POLYCARBONATES THEREFROM
Robert W. Miller, Bay City, and John A. Schmitt, Midland, Mich., assignors to The Dow Chemical Company, Midland, Mich., a corporation of Delaware
No Drawing. Filed Oct. 12, 1959, Ser. No. 845,606
3 Claims. (Cl. 260—47)

The present invention relates to a new process for the preparation of polycarbonates and is more particularly concerned with a new and useful process for the preparation of prepolymers and their subsequent polymerization to form high molecular weight polycarbonates and copolycarbonates.

Polycarbonates have been prepared commercially by the direct phosgenation of bisphenols in a two-phase system and by ester exchange (H. Schnell, Ind. and Eng. Chem., 51 (No. 2), 157 (1959). The resulting product from such direct phosgenation using commercial starting products has a lower molecular weight than that prepared in accordance with the present invention.

It is among the advantages of the present invention that purer product (ultimate polymer) can be obtained by the method herein described. Another advantage of the method herein described is that it permits removal of most of the impurities and admits of preparing higher molecular weight polymers than are obtained by the direct phosgenation of the same starting materials. A further advantage of the present invention is the easier and simplified procedural steps and the stability of the prepolymer in storage prior to polymerization.

It is an object of the present invention to provide a process for the production of high molecular weight polycarbonates and copolycarbonates (i.e., polymers and copolymers having a high Fikentscher K value). It is another object of the present invention to provide a process for the preparation of a prepolymer of a polycarbonate, which prepolymer can be employed in the production of purer high molecular weight polycarbonates and copolycarbonates. It is still another object of the present invention to provide a process for the preparation of prepolymers of polycarbonates and copolycarbonates in a single aqueous phase.

It has now been found that high molecular weight polycarbonates and copolycarbonates, i.e., those polycarbonates and copolycarbonates having high Fikentscher K values can be prepared by first reacting phosgene with a dihydroxy aromatic compound in the presence of dilute aqueous caustic to obtain a prepolymer as a solid. The resulting prepolymer can subsequently be polymerized or copolymerized by dissolving the prepolymer or mixtures of prepolymers from different dihydroxy aromatic compounds in an organic solvent in the presence of aqueous caustic and a polymerization catalyst. The resulting polycarbonate or copolycarbonate may have a Fikentscher K value as high as or higher than 50. Good results are obtained in the preparation of the prepolymer when the reactants, i.e., the dihydroxy compound, phosgene and alkali, are employed in substantially equimolecular proportions. Preferably, however, it is desirable to employ a slight excess of sodium hydroxide and phosgene. In practice it is convenient to introduce the phosgene gas, which may be diluted with an inert gas such as nitrogen, until the solution is neutral. This end-point can also be attained by continuing phosgenation until no more precipitate forms in the reaction mixture. The prepolymer can be recovered from the reaction mixture in conventional manner, such as by filtration or decantation, and washed with water until free of any salts.

The polymerization of the prepolymer to form the polymer is carried out in an aqueous caustic-organic solvent system in the presence of a polymerization catalyst such as benzyltrimethyl ammonium chloride or other quaternary ammonia salts. The choice of solvent is such that both the prepolymer and the resulting polycarbonate are soluble therein.

It is to be understood that one or more prepolymers prepared in accordance with the present invention can be polymerized or copolymerized to obtain a copolycarbonate of high molecular weight having random distribution throughout of the two or more different prepolymers. Illustrative of the copolymerization as aforedescribed is the employment of a prepolymer of a monochloroformate of Bisphenol A and a prepolymer of the monochloroformate of dihydroxybenzene. The resulting copolycarbonate has properties of the general class of Bisphenol A polycarbonates modified in some degree toward the class of dihydroxybenzene polycarbonates. It thus becomes apparent that the invention provides a new and useful technique to modify physical and chemical properties of polycarbonates to obtain the more desirable properties thus broadening the application of polycarbonates in industry by the copolymerization of two or more prepolymers in accordance with the present invention.

It should further be, understood that a mixture of dihydroxy aromatic compounds can be prepolymerized, recovered in crystal or powder form, and subsequently polymerized to form a copolymer of the nature aforedescribed.

Substantially any aromatic dihydroxy compound can be employed in the method of the present invention. For example, one can employ the alkylidene bisphenols such as p,p'-isopropylidenebisphenol, p,p'-sec.-butylidenebisphenol; p,p'-isopropylidenebis(2-methylphenol); p,p'-isopropylidenebis(2 - chlorophenol), p,p'-isopropylidenebis(2,5 - dichlorophenol); p,p'-isopropylidenebis(tert.-butylphenol); p,p'-isopropylidenebis(2-isopropyl phenol) and the corresponding o- and m-isomers; the dihydroxybenzenes, the dihydroxy naphthalenes, dihydroxy triphenyl and the like. Thus, substantially any dihydroxy aromatic compound can be employed in the manner hereinbefore described and particularly those dihydroxy aromatic compounds exemplified by having the formula

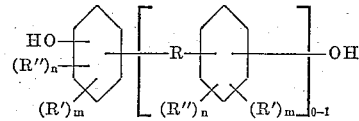

wherein R represents an alkylene radical having from 1 to 4 or more carbon atoms, inclusive, each R' represents hydrogen, an alkyl radical having from 1 to 4 carbon atoms, inclusive, cycloaliphatic radical having from 5 to 6 carbon atoms in the ring or an aryl radical; R" represents a halogen substituent having an atomic number from 9 to 35, inclusive; $n$ represents an integer from 0 to 4, inclusive; and $m$ represents an integer from 0 to 1, inclusive.

The phosgene employed in accordance with the present invention can be employed alone or it may be diluted with an inert gas such as nitrogen. The amount of phosgene to be employed is from about 1 to about 1½ moles per mole of dihydroxy compound.

The reaction proceeds readily at a temperature of about 0 to about 100° C. and has been found to be substantially complete at the lower temperatures in about 3 hours. However, shorter or longer reaction times may be employed as is convenient.

The amount of water present during reaction is not critical but should be sufficient to dissolve the caustic and thus to carry in solution the sodium salt of the phenol and hold in solution the sodium chloride of reaction.

The following examples are illustrative of the present invention but are not to be construed as limitnig.

EXAMPLES 1–13

Bisphenol A (p,p'-isopropylidenebisphenol) was dissolved in a dilute aqueous sodium hydroxide solution at room temperature and phosgene gas bubbled into the solution until the formation of precipitate ceased or until the solution was neutral. The precipitate was removed by filtration, washed with water until free of salts, and dried in air to obtain a light weight, white powder analyzing substantially monochloroformate of Bisphenol A. The amounts of each reactant, the temperature of reaction and the Fikentscher K value of the polymer formed therefrom by dissolving the prepolymer in organic solvent, i.e., methylene chloride, in presence of aqueous caustic and a polymerization catalyst, are each set forth in the following table.

Table I.—Examples of prepolymers and polymers from Bisphenol A

| Ex. No. | BPA (g.) | NaOH (g.) | H₂O (ml.) | T (° C.) | Polymer Fikentscher K |
|---|---|---|---|---|---|
| 1 | 570 | 245 | 6,000 | 27 | 72 |
| 2 | 570 | 245 | 6,000 | 27 | |
| 3 | 47 | 24 | 500 | 27 | |
| 4 | 141 | 70 | 5,000 | 27 | |
| 5 | 285 | 130 | 5,000 | 27 | 55 |
| 6 | 285 | 124 | 4,000 | 27 | 53 |
| 7 | 285 | 130 | 5,000 | 27 | |
| 8 | 11 | 6 | 200 | 10 | 41.5 |
| 9 | 11 | 6 | 200 | 24 | 38.5 |
| 10 | 11 | 6 | 200 | 40 | 49.0 |
| 11 | 23 | 12 | 400 | 65 | 47.5 |
| 12 | 57 | 32 | 500 | 25 | High |
| 13 | 57 | 29 | 1,000 | 27 | High |

EXAMPLES 14–21

In a manner similar to Examples 1–13, employing various dihydroxy aromatic compounds for the Bisphenol A, other prepolymers were prepared. The dihydroxy compound, amounts of reactants, temperature of reaction and K value of polymer formed therefrom are each given below in Table II.

Table II.—Examples of prepolymers and polymers from other phenols

| Ex. No. | Compound | Wt. (g.) | NaOH (g.) | H₂O (ml.) | T (° C.) | "K" of polymer |
|---|---|---|---|---|---|---|
| 14 | 4,4'-dihydroxy benzophenone (DHBP) | 10.7 | 7 | 100 | 25 | |
| 15 | DHBP+Bisphenol A | 5.35 g. DHBP +5.7 g. BPA. | 7 | 150 | 25 | |
| 16 | 2,2'-dimethyl Bisphenol A | 12.8 | 7 | 250 | 25 | 15 |
| 17 | 2,2'-dichloro Bisphenol A | 14.85 | 7 | 250 | 25 | 15 |
| 18 | 2,2',5,5'-tetrabromo Bisphenol A | 27.2 | 7 | 250 | 25 | 28 |
| 18 | 2,2',5,5'-tetrachloro Bisphenol A | 18.3 | 7 | 300 | 25 | 49 |
| 19 | 2,2'di.t-butyl Bisphenol A | 17 | 10 | 250 | 25 | |
| 20 | p,p'-(α-methylbenzylidene) diphenol | 13.8 | 7 | 250 | 25 | 18 |
| 21 | 2,2'-diisopropyl Bisphenol A | 15.6 | 7 | 250 | 25 | 37 |

Conversion of the prepolymer to the polycarbonate of high molecular weight is accomplished by dissolving the prepolymer in an organic solvent such as methylene chloride or chloroform in the presence of a polymerization catalyst, benzyltrimethyl ammonium chloride, and aqueous caustic. The prepolymer can also be employed to prepare a copolymer of high molecular weight polycarbonates. The amount of unreacted dihydroxy reactant must, however, be less than about 8.5 percent by weight of the prepolymer in order to obtain a high molecular weight copolymer. The evidence of such limitation is expressed in the table below.

| Percent by weight of Bisphenol A added to prepolymer of Example 1 before final polymerization: | "K" value of resulting polycarbonate |
|---|---|
| 0 | 58 |
| 5 | 69 |
| 8.5 | 74 |
| 8.6 | 14 |
| 17 | 10 |
| 40 | 10 |

The Finkentscher K-value of a polymeric substance is a number, as defined by Fikentscher in Cellulosechemie, 13, 60 (1932), that represents an approximate measure of the weight fraction of a given sample of polymer in an infinitesimal molecular weight range. Thus, it is a measure of molecular weight.

We claim:

1. A process for the preparation of monochloroformates of aromatic dihydroxy compounds which consists essentially of reacting phosgene with an aromatic dihydroxy compound in a reaction medium consisting essentially of dilute aqueous caustic at a temperature of from 0 to 100° C.; said phosgene being employed in an amount of from between about 1 to 1.5 moles of phosgene per mole of dihydroxy compound; said caustic is employed in at least an equimolecular proportion with the dihydroxy compound; said dihydroxy aromatic compound having the general formula

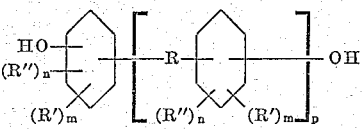

wherein R represents an alkylene radical having from 1 to 4 carbon atoms, inclusive; R' represents a member selected from the group consisting of hydrogen, alkyl, aryl and 5 to 6 membered cycloaliphatic radicals; R" represents a halogen substituent having an atomic number from 9 to 35, inclusive; n represents an integer from 0 to 4, inclusive; and, m and p each represent an integer from 0 to 1, inclusive, and separating the monochloroformate which forms as a water-insoluble solid.

2. The process which consists essentially of reacting the monochloroformate of claim 1 in the presence of a polymerization catalyst in a reaction medium consisting essentially of an aqueous caustic and an organic solvent and agitating until the reaction subsides; and, separating the polymeric polycarbonate which forms from the organic solvent.

3. A process for the preparation of high molecular weight polymeric polycarbonates which consists essentially of reacting phosgene with 4,4'-isopropylidenebisphenol in a reaction medium consisting essentially of aqueous sodium hydroxide at a temperature of from about 20° to 40° C., said phosgene and sodium hydroxide being employed in about equimolecular quantities based on said phenol; separating the solid which forms; reacting said solid in the presence of a reaction medium consisting essentially of aqueous sodium hydroxide and an organic solvent for the polymer which forms, and a polymerization catalyst, under mild agitation until the reaction subsides.

References Cited by the Examiner

UNITED STATES PATENTS

| | | | |
|---|---|---|---|
| 2,964,797 | 12/60 | Peilstocker et al. | 260—47 |
| 2,970,131 | 1/61 | Moyer et al. | 260—47 |
| 3,030,331 | 4/62 | Goldberg | 260—47 |

FOREIGN PATENTS

| | | |
|---|---|---|
| 772,627 | 4/57 | Great Britain. |
| 117,624 | 1/01 | Germany. |
| 251,805 | 10/12 | Germany. |

OTHER REFERENCES

J.A.C.S., article by Oesper et al., October 1925, pages 2609, 2610, vol. 47.

WILLIAM H. SHORT, *Primary Examiner.*

MILTON STERMAN, JOSEPH L. SCHOFER,
*Examiners.*